United States Patent
Zhi et al.

(10) Patent No.: US 12,340,480 B2
(45) Date of Patent: Jun. 24, 2025

(54) TEXT-TO-3D AVATARS

(71) Applicant: Lemon Inc., Grand Cayman (KY)

(72) Inventors: Tiancheng Zhi, Los Angeles, CA (US); Rushikesh Dudhat, Los Angeles, CA (US); Jing Liu, Los Angeles, CA (US); Linjie Luo, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 111 days.

(21) Appl. No.: 18/155,400

(22) Filed: Jan. 17, 2023

(65) Prior Publication Data

US 2024/0242452 A1    Jul. 18, 2024

(51) Int. Cl.
| | |
|---|---|
| G06T 19/20 | (2011.01) |
| A63F 13/52 | (2014.01) |
| G06N 3/045 | (2023.01) |
| G06N 3/0475 | (2023.01) |
| G06N 3/094 | (2023.01) |
| G06T 17/00 | (2006.01) |

(52) U.S. Cl.
CPC .............. *G06T 19/20* (2013.01); *A63F 13/52* (2014.09); *G06N 3/045* (2023.01); *G06N 3/0475* (2023.01); *G06N 3/094* (2023.01); *G06T 17/00* (2013.01); *G06T 2219/2024* (2013.01)

(58) Field of Classification Search
CPC . G06T 19/20; G06T 17/00; G06T 2219/2024; G06N 3/045; G06N 3/0475; G06N 3/094; A63F 13/52
See application file for complete search history.

(56) References Cited

U.S. PATENT DOCUMENTS

| | | | |
|---|---|---|---|
| 2019/0035149 A1* | 1/2019 | Chen | G06V 40/166 |
| 2020/0334853 A1* | 10/2020 | Ciuc | G06T 7/246 |
| 2021/0150197 A1* | 5/2021 | Kokkinos | G06V 10/74 |
| 2024/0221281 A1* | 7/2024 | Abdal | G06T 15/02 |

OTHER PUBLICATIONS

Fangzhou Hong et al., AvatarCLIP: Zero-Shot Text-Driven Generation and Animation of 3D Avatars, ACM Trans. Graph., vol. 41, No. 4, Article 161. Publication date: Jul. 2022 (19 pages).
Oscar Michel et al., "Text2Mesh: Text-Driven Neural Stylization for Meshes", 2021 (15 pages).
Eric R. Chan et al., Efficient Geometry-aware 3D Generative Adversarial Networks, 2022 (27 pages).
Rombach et al., High-Resolution Image Synthesis with Latent Diffusion Models, 2022 (45 pages).

* cited by examiner

*Primary Examiner* — Michelle Chin
(74) *Attorney, Agent, or Firm* — Fish & Richardson P.C.

(57) ABSTRACT

Three-dimensional (3D) avatars may be produced by stylizing a dataset of images based on a user-input text prompt input to a stable diffusion model, and using the output stylized dataset of images to train an efficient geometry-aware 3D generative adversarial network (EG3D) model.

24 Claims, 4 Drawing Sheets

300

PROVIDE TEXT PROMPT

305

PROVIDE DATASET OF IMAGES

310

STYLIZE IMAGES

315

TRAIN IMAGE GENERATOR

320

GENERATE 3D AVATARS

325

TEXT-TO-3D AVATARS

TECHNICAL FIELD

The embodiments described herein pertain generally to text-to-image technologies.

BACKGROUND

Large-scale text-to-image synthesis models, e.g., diffusion models, have become easily accessible and have diverse utility due to their combining various forms of art and technology. Such models generate high-fidelity images based on text prompts, e.g., two-dimensional (2D) images with applications like semantic image synthesis, image in-painting and out-painting, text-driven image editing, etc.

SUMMARY

In one example embodiment disclosed and recited herein, a method for producing a model to generate three-dimensional (3D) avatars includes stylizing a dataset of images based on a user-input text prompt input to a Stable Diffusion model; and producing 3D avatars, based on the stylized dataset of images, by an efficient geometry-aware 3D generative adversarial network (EG3D) model.

In accordance with at least one other example embodiment disclosed and recited herein, a method for providing a selection of three-dimensional (3D) avatars for an application user includes: providing a text prompt, received from an account for the application user, to a stable diffusion model; inputting a dataset of images to the Stable Diffusion model; stylizing the dataset of images, by the stable diffusion model, based on the text prompt; training an efficient geometry-aware 3D generative adversarial network (EG3D) model with the stylized dataset of images; and outputting 3D avatars from the EG3D model for selection by an application user.

In accordance with another example embodiment disclosed and recited herein, a system for providing customized avatars includes an input unit to transmit a text prompt and a processing system. The processing system is to receive the text prompt, receive a dataset of images, stylize the dataset of images by applying a descriptor included in the text prompt to the dataset of images by executing a stable diffusion model, train an image generating model with the stylized dataset of images, generate avatars in a style corresponding to the descriptor included in the text prompt by executing the image generating model, and output at least a portion of the generated avatars to a user device for selection.

In accordance with at least one other example embodiment disclosed and recited herein, 3D avatars are generated in a style listed in a text prompt using a process that includes: receiving the text prompt from a user, with the text prompt including a descriptor of an illustrative style for the 3D avatars; applying the descriptor to a dataset of images by executing a stable diffusion model to modify the dataset of images in the illustrative style corresponding to the descriptor; training an efficient geometry-aware 3D generative adversarial network (EG3D) model with the modified dataset of images; and producing the 3D avatars corresponding to the modified dataset of images by executing the EG3D model.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
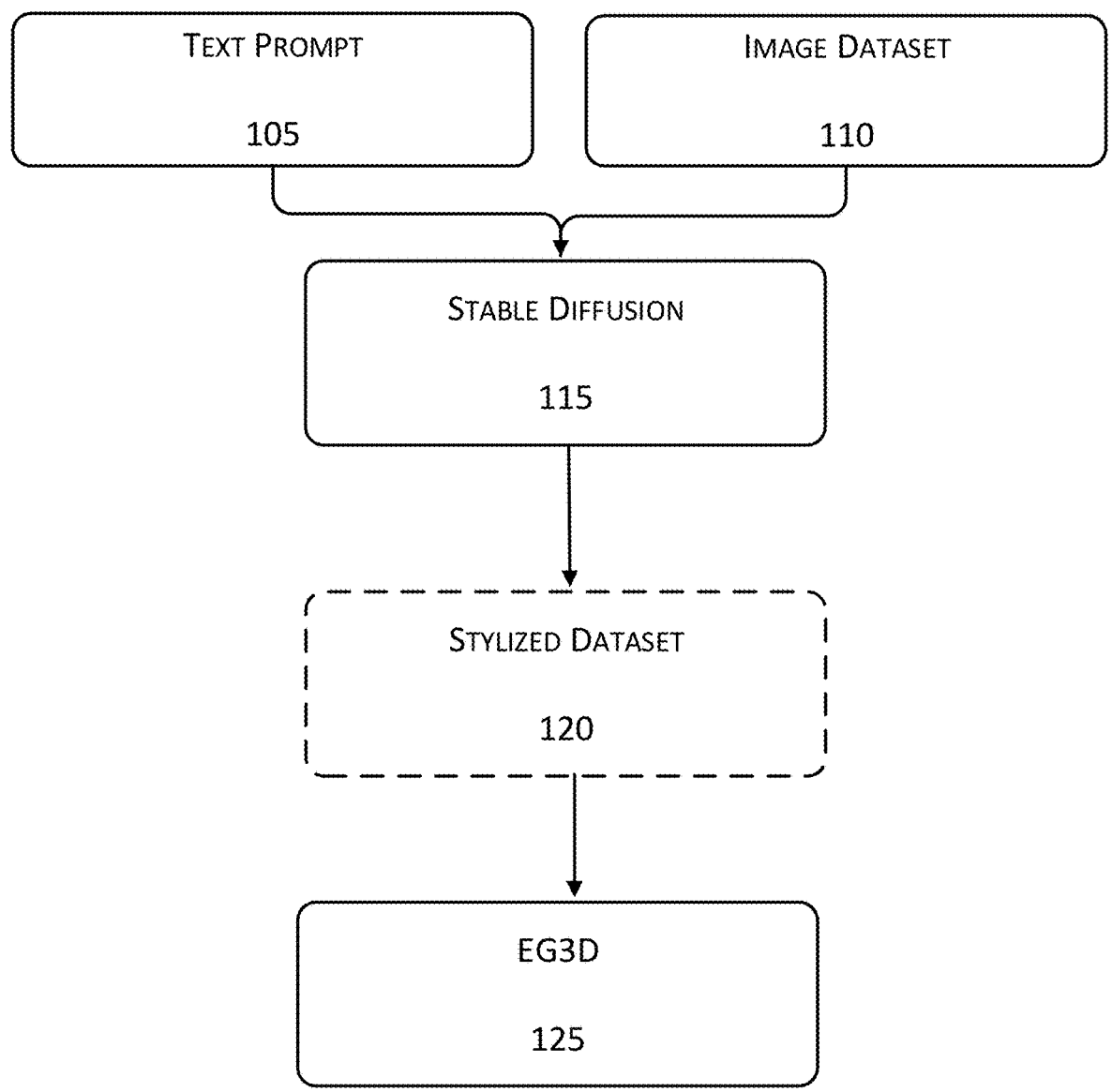
FIG. 1 shows a schematic overview of an implementation of text-to-3D avatars, arranged in accordance with at least some embodiments described and recited herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the features of the present disclosure, as generally described and recited herein, as well as illustrated in the drawings, may be arranged, substituted, combined, separated, and designed in a wide variety of different configurations, all of which are explicitly contemplated herein.

Additionally, portions of the present disclosure may be described herein in terms of functional block components and various processing functions, steps, or operations. It should be appreciated that such functional blocks may be realized by any number of hardware and/or software components configured to perform the specified functions.

In the present description and recitation, the following terms may be used, in addition to their accepted meaning, as follows.

Machine learning may refer to a learned or trained computer or processor-related technology by which decisions and/or actions are autonomously made, in place of human intervention. Machine learning refers to software, i.e., algorithms and/or programs, hardware or firmware, or any combination thereof that supports natural language understanding and/or processing, speech recognition, computer vision, etc. Also included among the range of machine learning functions and capabilities, and pertinent to the embodiments disclosed, recited, and suggested herein, are model training and image generation.

An engine or generator, as referenced herein, may refer to a type of software, firmware, hardware, or any combination thereof, that facilitates generation of source code or markup to produce elements that begin another process. In addition, or alternatively, an engine or generator may facilitate automated processes, in which various software elements interact to produce an intended product, whether physical or virtual based on natural language descriptions, inputs, or other prompts. In accordance with known machine learning technologies, the machine learning engines or generators disclosed, recited, and/or suggested herein are trained in accordance with either unimodal or multimodal training models.

Text-to-image model image generation, as referenced herein, may refer to generation or production of an image, by a machine learning model, based on a natural language description input. Training a text-to-image model requires a dataset of images paired with text captions, e.g., classifications and/or descriptors.

Diffusion models, as referenced herein, are a class of machine learning models that generate new data based on training data. More particularly, diffusion models add noise to training data and then reverse the noising process to recover the data, thus generating coherent images from noise. Even more particularly, a neural network is trained to de-noise images blurred with Gaussian noise by learning to reverse the diffusion process.

A social media application, as referenced herein, may refer to an on-line application that allows account-holding users to interact with one another using various media and on varying scales, with such interaction including creating and/or sharing media content. As disclosed and recited herein, a user device may have an instance of social media application account stored locally or may access the user's account via a web-based version of the particular social media application.

A gaming application, as referenced herein, may refer to an on-line application that facilitates interaction with a user interface or input device to generate visual feedback for a competitive and/or cooperative online endeavor. A gaming application may be implemented via an online platform that facilitates interaction between remote users, each of which participates using a separate smartphone; computer, e.g., tablet, server-based, etc.; virtual and/or augmented reality system; and/or cloud-based processing device.

A platform, e.g., a social media platform and/or gaming platform, as referenced herein, may refer to an application on which algorithms and/or programs enabling execution or implementation of a collection of communication-based or media-sharing technologies may be hosted. Further, any algorithm or program described, recited, or suggested herein may be executed by one or more processors hosted on such a platform. Non-limiting examples of such technologies may include the creation, sharing, and/or storage of multi-media offerings.

Media, or multi-media, offerings or experiences, as referenced herein, may include but not be limited to recorded or live transmittable content including text, audio, images, animations, video, games, etc. In addition, such offerings or experiences may include, but again not be limited to, interactive augmented reality (AR) and/or interactive virtual reality (VR) experiences.

By the non-limiting example embodiments, text-to-image diffusion models may be extended to text-driven synthetic 3D data generation. 2D image datasets, along with their pose information, are used to train an image generator; and the images are edited using text prompts. The resulting images are used to optimize an EG3D model via gradient descent to obtain a new 3D generative model for those resulting images. Thus, the embodiments may be utilized to create domain-specific 3D datasets and even to train 3D versions of these large diffusion models.

FIG. 1 shows a schematic overview 100 of an implementation of text-to-3D avatars, arranged in accordance with at least some embodiments described and recited herein. As depicted, overview 100 includes text prompt 105 and image dataset 110 being input to stable diffusion model 115; stable diffusion model 115 outputting stylized dataset 120; and stylized dataset 120 inputting to train efficient geometry-aware 3D generative adversarial network (EG3D) model 125. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

In accordance with the non-limiting example embodiment of FIG. 1, the model shown may generate three-dimensional (3D) avatars by stylizing a dataset of images based on a user-input text prompt input to a stable diffusion model, and producing 3D avatars based on the stylized dataset of images by an efficient geometry-aware 3D generative adversarial network (EG3D) model.

Stylized, as referenced herein, may refer to an output that is provided in an illustrative style that is described or otherwise included in a text prompt. Typically, though not exclusively the illustrative style is provided in a text prompt manually input, via a user device, to a diffusion model. However, the embodiments described, recited, or otherwise contemplated herein pertain to both manual and automated input of the illustrative style as part of a text prompt.

Image datasets, as referenced herein, may refer to a collection of images curated for machine learning, i.e., for training, testing, evaluation, etc. In accordance with the non-limiting example embodiments of text-to-3D avatars described, recited, and contemplated herein, image datasets may serve to, at least, train stable diffusion model 115; and a stylized dataset may serve to, at least, train EG3D model 125. In accordance with at least some embodiments, both image datasets and stylized image datasets may include a number of images ranging from one to hundreds of thousands.

Further, though not limiting, in accordance with at least some of the embodiments of text-to-3D avatars described and recited herein, image dataset 110 includes headshots, i.e., a portrait of a person. However, alternative embodiments of dataset 110 may include images of stationary or rigid objects for which a pose or orientation may be articulated or described in Euler angles, i.e., a coordinate system including the x, y, and z axes.

That is, in accordance with the embodiments of text-to-3D avatars described, recited, and suggested herein, image dataset 110 includes images for which, respectively, a pose or orientation is expressed in Euler angles, regardless of whether the respective images are headshots or not. Further, though information regarding a pose or orientation of a respective image corresponding to image dataset 110 may be expressed in multiple alternative ways, such information may be included as metadata that is written into a respective image, in accordance with at least some non-limiting embodiments. Technologies for writing and deriving such metadata and writing it into a respective image are known.

Stable diffusion model 115, as described and recited herein, refers to a deep learning, text-to-image diffusion model used to generate detailed images conditioned on descriptions included within a text prompt. Stable diffusion utilizes a latent diffusion model, which is a variant of a diffusion model.

Stylized dataset 120, as described and recited herein, refers to an output of stable diffusion model 115 that may be trained on image dataset 110 and/or another image dataset, and provided in an illustrative style that is described or otherwise included in text prompt 105. Further, respective images within stylized dataset 120 retain the information corresponding to the pose or orientation of the image. Alternatively, the information corresponding to the pose or orientation may be provided separately.

Stylized dataset 120, as further described and recited herein, may also refer to an input to train EG3D model 125.

EG3D 125, as described and recited herein, refers to an efficient geometry-aware 3D generative adversarial network (EG3D) model that is a novel generator architecture for unsupervised 3D representation learning from a collection of single-view 2D photographs. EG3D 125 provides improved computational efficiency of rendering that remains true to 3D-grounded neural rendering. That is, the computational efficiency of 3D-grounded rendering utilizes a hybrid explicit—implicit 3D representation that offers significant speed and memory benefits over fully implicit or explicit approaches without compromising on expressiveness. Most notably, with regard to the embodiments described and recited herein, EG3D utilizes pose-based conditioning to decouple pose-correlated attributes, e.g., facial expressions, for a multi-view-consistent output that faithfully models the joint distributions of post-related information provided in the training data, e.g., stylized dataset 120.

Further, in accordance with the embodiments described and recited herein, at least some of the 3D avatars produced by EG3D 125 may be provided to, or otherwise made available to, a user of a media platform, e.g., a social media platform, a gaming platform, etc., for use as an avatar for a user or subscriber.

Figure 2:
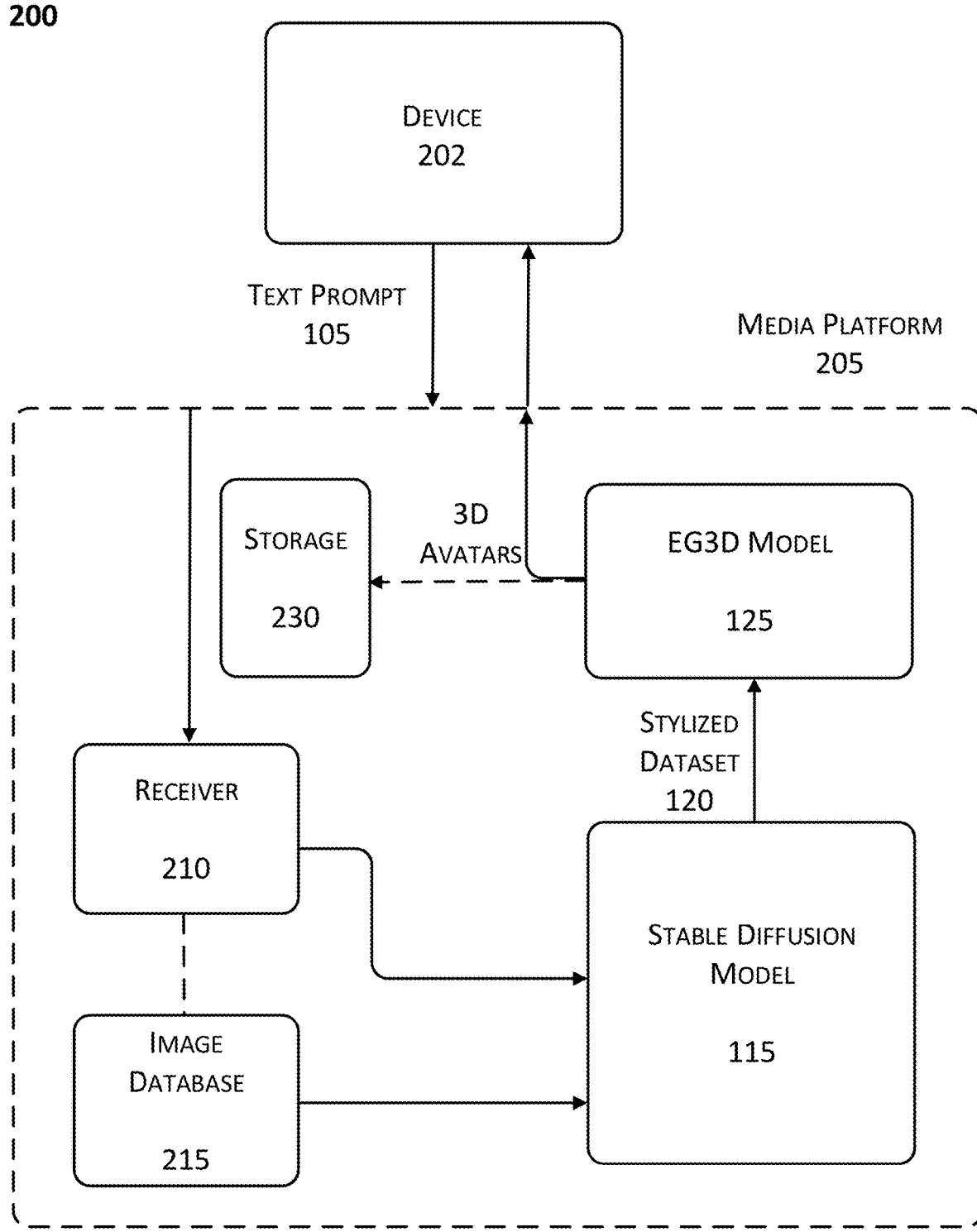
FIG. 2 is a system by which text-to-3D avatars may be implemented or executed, arranged in accordance with at least some embodiments of automatic data generation described and recited herein.

FIG. 2 is a schematic view of a system 200 by which text-to-3D avatars may be implemented, arranged in accordance with at least some embodiments described and recited herein. As depicted, media platform 205 includes at least receiver 210, image database 215, stable diffusion model 115, EG3D model 125, and, optionally, avatar storage 230. It will also be understood that each function and/or operation of the various components may be implemented, individually and/or collectively, by a wide range of hardware, software, firmware, or any combination thereof. Further, although illustrated as discrete components, various components may be divided into additional components, combined into fewer components, or eliminated altogether while being contemplated within the scope of the disclosed subject matter.

Device 202 may refer to one or more embodiments of a classical computing device that may be, or include, a classical computer, processing device, a microprocessor, a microcontroller, a digital signal processor, or any combination thereof. Device 202 may be one of various electronic devices, or a combination thereof, having one or more image and/or video capturing components, i.e., camera and/or video recorder, display screens with audio and/or video inputs/outputs and that support the providing of and consumption of content relative to a media platform. The various electronic devices may include but not be limited to a smartphone, a tablet computer, a laptop computer, a desktop computer, a gaming console, and/or any other suitable electronic devices.

Non-limiting examples of input device 202 as a specialize gaming console may include, but not be limited to, a Microsoft® XBox®, Sony® Playstation®, a Nintendo Switch®, Apple®TV®, Sega® Genesis®, etc. Non-limiting examples of input device 202 as an augmented reality (AR) and/or virtual reality (VR) console may include, but not be limited to, Oculus Rift®, HTC® Vive®, Playstation® VR, Microsoft® Hololens®, etc. Additional non-limiting examples of input device 202 may include a database, local server, cloud-based service, etc. Further, any algorithm or program described, recited, or suggested herein may be executed by one or more processors hosted on input device 202.

Text prompt 105, in accordance with at least some of the embodiments disclosed and recited herein, may refer to a known sampling script, e.g., txtimg, utilized in accordance with stable diffusion model 115. Text prompt 105 may include a desired or otherwise preferred illustrative style for the ultimately provided 3D avatars, as well as other optional parameters including, but not limited to sampling types, output image dimensions, seed values, etc. Text prompt 105 may be input manually or in an automated manner to an appropriate input interface from input device 202 to receiver 210 corresponding to media platform 205, via a wired or wireless network. Such network may be regarded as a medium that is provided as a bidirectional communications link between media platform 205 and input device 202. The network may include the Internet, a local area network (LAN), a wide area network (WAN), a local interconnect network (LIN), a localized cloud, etc.

Media platform 205 may refer to, e.g., a social media platform, and/or a gaming platform, as non-limiting examples, on which is implemented an application to provide users with a selection among one or more 3D avatars in an illustrative style indicated in text prompt 105. As stated previously, each function and/or operation of the various components of media platform 205 may be implemented, individually and/or collectively, by a wide range of hardware, software, firmware, or any combination thereof; and may be divided into additional components, combined into fewer components, or eliminated altogether while being contemplated within the scope of the disclosed subject matter. Thus, the components of media platform 205, as described and recited herein, may be regarded as a computing and/or processing system.

Receiver 210 may refer to a component that is designed, configured, or otherwise programmed to receive text prompt 105 from device 202 and to identify the stated illustrative style listed therein, using known technologies.

Image database 215 may refer to a component that is designed, configured, or otherwise programmed to store image dataset 110 for at least training stable diffusion model 115. In accordance with at least some embodiments, stable diffusion model 115 may be trained by an image dataset other than image dataset 110, and image dataset 110 may be input to stable diffusion model 115, to be utilized to generate a stylized dataset.

Stable diffusion model 115, further to the description thereof corresponding to FIG. 1, may also be designed, configured, or otherwise programmed to receive the illustrative style stated in text prompt 105, from receiver 210, and image dataset 110 from image database 215.

In accordance with at least one alternative embodiment, stable diffusion model 115 may be designed, configured, or otherwise programmed to receive text prompt 105 directly from device 202, thus bypassing receiver 210; and to further parse the stated illustrative style from the received text prompt. Further, image dataset 110 received by stable diffusion model 115 may include a portion or the entirety of the training images stored in image database 215.

Styled dataset 120 may refer to the output of stable diffusion model 115 that is trained on image dataset 110 and provided in the illustrative style stated in text prompt 105. Respective images within stylized dataset 120 retain the information corresponding to the pose or orientation of the image. Once output from stable diffusion model 115, stylized dataset 120 may be input to train EG3D model 125.

As referenced previously, stable diffusion model 115 may be trained by an image dataset other than image dataset 110, and image dataset 110 may be input to stable diffusion model 115, to be utilized to generate a stylized dataset.

EG3D model 125, further to the description thereof corresponding to FIG. 1, may also be designed, configured, or otherwise programmed to receive stylized dataset 120 for training purposes. In accordance with EG3D rendering, the output 3D avatars may have 3D geometry learned from the pose information of respective images from stylized dataset 120.

The 3D avatars output from EG3D model 125 may be stored in storage 230 on media platform 205 for subsequent manual or automated selection, or the 3D avatars may be transmitted to device 202 from which text prompt 105 is transmitted or received.

Figure 3:
FIG. 3 shows an example processing flow for implementation of text-to-3D avatars, in accordance with at least some embodiments described and recited herein.
Figure 3:
Figure 3:

FIG. 3 shows an example processing flow for implementation of text-to-3D avatars, as described and recited herein. As depicted, processing flow 300 includes operations or sub-processes executed by various components of system 200, including media platform 205, as shown and described in connection with FIGS. 1 and 2. However, processing flow 300 is not limited to such components and processes, as obvious modifications may be made by re-ordering two or more of the sub-processes described here, eliminating at least one of the sub-processes, adding further sub-processes, substituting components, or even having various components assuming sub-processing roles accorded to other components in the following description.

Processing flow 300 may include various operations, functions, or actions as illustrated by one or more of blocks 305, 310, 315, 320, and 325. These various operations, functions, or actions may, for example, correspond to software, program code, or program instructions executable by a processor that causes the functions to be performed.

The description of processing flow 300 is illustrated and described as beginning at block 305. However, non-limiting embodiments of flow 300 may include processing beginning with the operation of block 310, and continuing with the processing of blocks 305, 315, 320, and 325. Further still, non-limiting embodiments of flow 300 may include processing beginning with the operations of blocks 305 and 310 being executed in parallel, and continuing with the processing of blocks 315, 320, and 325.

At block 305 (provide text prompt), text prompt 105 may be provided to media platform 205. In accordance with at least the embodiment of FIG. 2, text prompt 105 may be provided to receiver 210; though, in accordance with at least one alternative embodiment, text prompt 105 may be provided directly to stable diffusion model 115. Regardless, text prompt 105 may include a desired or otherwise preferred illustrative style for the ultimately provided 3D avatars, as well as other optional parameters including, but not limited to sampling types, output image dimensions, seed values, etc. Text prompt 105 may be provided manually or automatically from input device 202 via a wired or wireless network.

As non-limiting examples, the preferred illustrative style for the 3D avatars may include cartoon style, anime style, gothic style, or any other preferred descriptor. As further non-limiting examples, the preferred illustrative style may also be provided as a name, preferably of a known individual, i.e., celebrity; e.g., Elon Musk, Barack Obama, Taylor Swift, etc. Further still, the preferred illustrative style may include a combination, e.g., "Eton Musk as a cartoon." Regardless of the descriptor, stable diffusion model 115 does not have structural requirements for text prompt 105, but rather relies upon word parsing technologies to identify the stated illustrative style. However, the more explicitly the preferred illustrative style is stated, the more on-point the resulting 3D avatars are likely to be provided.

In the non-limiting example of processing flow 300, text prompt 105 provided at block 305 may indicate a preference for cartoon style avatars. Processing may proceed from block 305 to block 310.

At block 310 (provide dataset of images), image dataset 110 may be provided to stable diffusion model 115 from image database 215 or, in accordance with at least one alternative embodiment, from receiver 210. Regardless, image dataset 110, as input to stable diffusion model 115, may include headshots, i.e., a portrait of a person or, alternatively, images of stationary or rigid objects. That is, for respective images included in the provided image dataset 110, pose or orientation information may be articulated or described in, e.g., Euler angles, i.e., a coordinate system including the x, y, and z axes, as appropriate for EG3D technologies, as referenced and/or described herein; and, though information regarding a pose or orientation of a respective image corresponding to image dataset 110 may be expressed in other ways, such information may be included as metadata that is written into a respective image.

In the non-limiting example of processing flow 300, image dataset 110 includes images input as photos or otherwise procured from online sources, similar to the headshot shown in block 310, in quantities ranging from one to hundreds of thousands. Processing may proceed from block 310 to block 315.

At block 315 (stylize images), stable diffusion model 115 may output stylized dataset 120, provided in the illustrative style that is described or otherwise included in text prompt 105. As set forth above, in the non-limiting example of flow 300, the illustrative style in which the images are stylized is a cartoon style.

In the non-limiting example of processing flow 300, stylized dataset 120 may include the images that were input as photos or otherwise procured from online sources at block 310 and then edited, revised, or otherwise transformed in accordance with the illustrative style that was described or otherwise included in text prompt 105. Thus, the image shown in block 310 is output, i.e., shown in block 315 in a cartoon style. It is noted that stable diffusion model 115 produces 2D images, and that the transformed images retain the corresponding pose information or, alternatively, having the corresponding pose information provided separately after being stylized. Processing may proceed from block 315 to block 320.

At block 320 (train image generator), stylized dataset 120, which are output at block 315, are input to train EG3D model 125, retaining the pose information for respective stylized images, as appropriate for EG3D modeling. Processing may proceed from block 320 to block 325.

At block 325 (generate 3D avatars), ED3G model 125 utilizes the pose information corresponding to images within stylized image dataset 120, generated at block 315 and input at block 320, to decouple pose-correlated attributes, e.g., facial expressions, for a multi-view-consistent output that faithfully models the joint distributions of post-related information provided in the training data to produce 3D models, i.e., avatars, such as those shown in block 325. Thus, the respective 3D models/avatars may have a pitch, yaw, and roll that corresponds to the Euler angles for the respective training images. Further, the 3D models may be produced based on the input; thus, the produced 3D models may range in quantity from one to hundreds of thousands. In the non-limiting example of flow 300, the illustrative style in which the 3D avatars are stylized is a cartoon style.

In accordance with the example embodiments described and recited herein, as shown in FIG. 2, the 3D models/avatars generated at block 315 may be stored in storage 230 on media platform 205 for subsequent manual or automated selection, or may be transmitted to device 202 from which text prompt 105 is transmitted or received. The latter scenario is one that is likely, though not exclusively so, when media platform 205 corresponds to a social media platform or a gaming platform.

Accordingly, in a non-limiting example, a user of an online application may include 305 providing a text prompt, received from an account for the application user, to a stable diffusion model; 310 inputting a dataset of images to the stable diffusion model; 315 stylizing the dataset of images, by the stable diffusion model, based on the text prompt; 320 training a EG3D model with the stylized dataset of images; and 325 outputting 3D avatars from the trained EG3D model for selection by an application user. Such online application may be a social media application, an online gaming application, etc.

Figure 4:
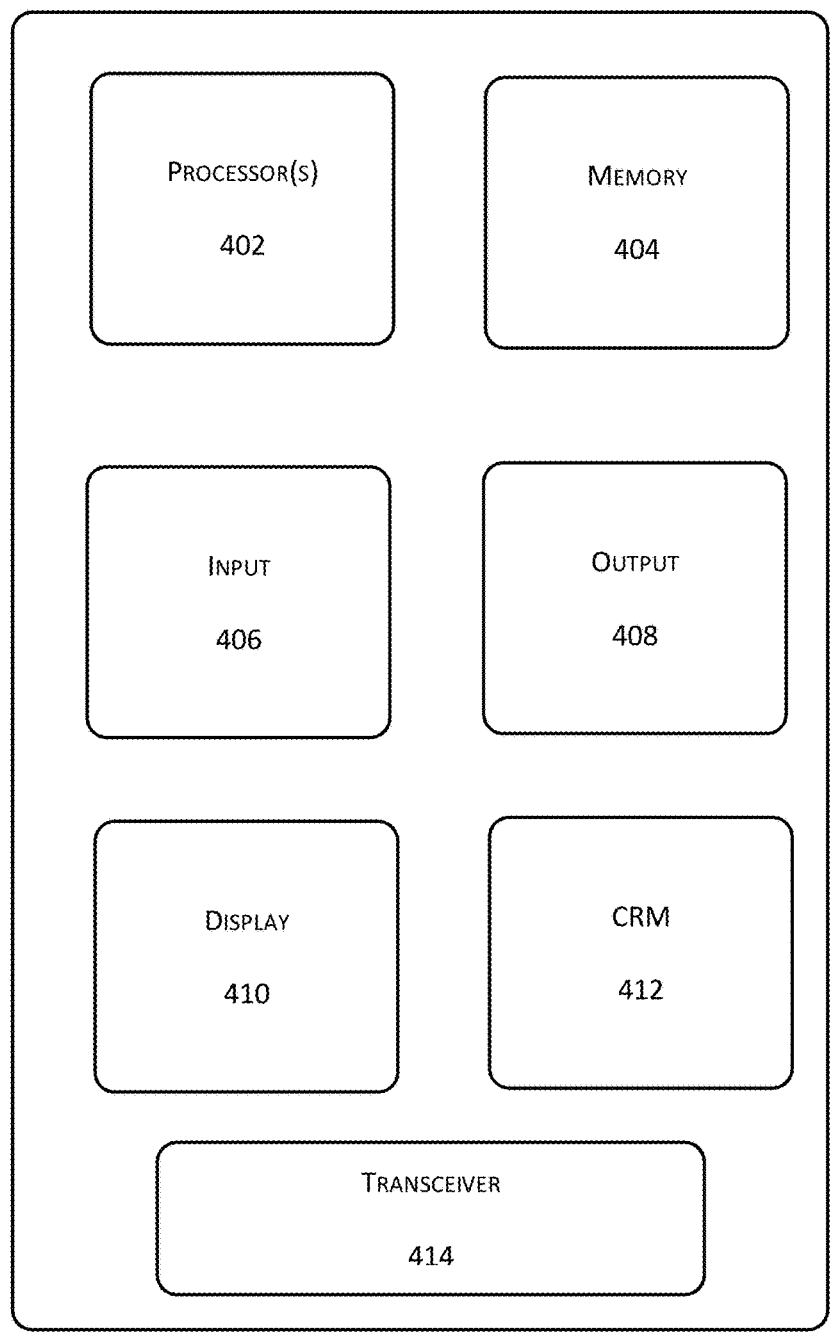
FIG. 4 shows an illustrative computing embodiment, in which any of the processes and sub-processes for text-to-3D avatars may be implemented as executable instructions stored on a non-volatile computer-readable medium.

FIG. 4 shows an illustrative computing embodiment, in which any of the processes and sub-processes of text-to-3D avatars may be implemented as executable instructions stored on a non-volatile computer-readable medium. The computer-readable instructions may, for example, be executed by a processor of a device, as referenced herein, having a network element and/or any other device corresponding thereto, particularly as applicable to the applications and/or programs described above corresponding to system 200 to implement text-to-3D avatars.

In a very basic configuration, a computing device 400 may typically include, at least, one or more processors 402, a memory 404, one or more input components 406, one or more output components 408, a display component 410, a computer-readable medium 412, and a transceiver 414.

Processor 402 may refer to, e.g., a microprocessor, a microcontroller, a digital signal processor, or any combination thereof.

Memory 404 may refer to, e.g., a volatile memory, non-volatile memory, or any combination thereof. Memory 404 may store, therein, an operating system, one or more applications corresponding to media platform 205 and/or program data therefore. That is, memory 404 may store executable instructions to implement any of the functions or operations described above and, therefore, memory 404 may be regarded as a computer-readable medium.

Input component 406 may refer to a built-in or communicatively coupled keyboard, touch screen, telecommunication device, i.e., smartphone, and/or a microphone that is configured, in cooperation with a voice-recognition program that may be stored in memory 404, to receive voice commands from a user of computing device 400. Further, input component 406, if not built-in to computing device 400, may be communicatively coupled thereto via short-range communication protocols including, but not limitation, radio frequency or Bluetooth®.

Output component 408 may refer to a component or module, built-in or removable from computing device 400, that is configured to output commands and data to an external device.

Display component 410 may refer to, e.g., a solid state display that may have touch input capabilities. That is, display component 410 may include capabilities that may be shared with or replace those of input component 406.

Computer-readable medium 412 may refer to a separable machine-readable medium that is configured to store one or more programs that embody any of the functions or operations described above. That is, computer-readable medium 412, which may be received into or otherwise connected to a drive component of computing device 400, may store executable instructions to implement any of the functions or operations described above. These instructions may be complimentary or otherwise independent of those stored by memory 404.

Transceiver 414 may refer to a network communication link for computing device 400, configured as a wired network or direct-wired connection. Alternatively, transceiver 414 may be configured as a wireless connection, e.g., radio frequency (RF), infrared, Bluetooth®, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

ASPECTS

Aspect 1. A method for producing a model to generate three-dimensional (3D) avatars, the method comprising:
stylizing a dataset of images based on a user-input text prompt input to a stable diffusion model; and
producing 3D avatars based on the stylized dataset of images by an efficient geometry-aware 3D generative adversarial network (EG3D) model.

Aspect 2. The method of Aspect 1, wherein the user-input text prompt lists an illustrative style for the 3D avatars.

Aspect 3. The method of either Aspect 1 or Aspect 2, wherein, along with the stylized dataset of images, a pose of respective ones of the stylized images is input to the EG3D model for training of the EG3D model.

Aspect 4. The method of Aspect 3, wherein the pose is provided as metadata corresponding to respective ones of the stylized images.

Aspect 5. The method of either of Aspect 3 or Aspect 4, wherein the pose includes Euler angles along x, y, and z axes.

Aspect 6. The method of any of Aspects 3-5, wherein the EG3D model generates the 3D avatars corresponding to respective ones of the stylized images in the illustrative style listed in the user-input text prompt.

Aspect 7. The method of any of Aspects 3-5, wherein the EG3D model generates the 3D avatars having a pitch, yaw, and roll corresponding to the pose provided for corresponding ones of the respective stylized images.

Aspect 8. A method for providing a selection of three-dimensional (3D) avatars for an application user, the method comprising:
providing a text prompt, received from an account for the application user, to a stable diffusion model;

inputting a dataset of images to the stable diffusion model;
stylizing the dataset of images, by the stable diffusion model, based on the text prompt;
training an efficient geometry-aware 3D generative adversarial network (EG3D) model with the stylized dataset of images; and
outputting 3D avatars from the EG3D model for selection by the application user.

Aspect 9. The method of Aspect 8, wherein the text prompt includes a desired style for the 3D avatars.

Aspect 10. The method of either of Aspect 8 or Aspect 9, wherein the images in the stylized dataset of images respectively include pose information.

Aspect 11. The method of Aspect 10, wherein the pose information is included as metadata and includes Euler angles along x, y, and z axis.

Aspect 12. The method of any of Aspects 8-11, wherein the application is a social media application.

Aspect 13. The method of any of Aspects 8-11, wherein the application is an online interactive game.

Aspect 14. The method of any of Aspects 8-13, wherein the dataset of images include headshots.

Aspect 15. A system for providing customized three-dimensional (3D) avatars, comprising:
an input unit to transmit a text prompt; and
a processing system to:
receive the text prompt,
receive a dataset of images,
stylize the dataset of images by applying a descriptor included in the text prompt to the dataset of images by executing a stable diffusion model,
train an efficient geometry-aware 3D generative adversarial network (EG3D) model with the stylized dataset of images,
generate 3D avatars in a style corresponding to the descriptor included in the text prompt by executing the EG3D model, and
output at least a portion of the generated 3D avatars to a user device for selection.

Aspect 16. The system of Aspect 15, wherein the customized avatars are three-dimensional (3D).

Aspect 17. The system of either of Aspect 15 or Aspect 16, wherein the image generating model is an efficient geometry-aware 3D generative adversarial network (EG3D).

Aspect 18. The system of any of Aspects 15-17, wherein the descriptor is a graphic style.

Aspect 19. The system of any of Aspects 15-18, wherein stylized images included in the stylized dataset of images include corresponding pose information indicating Euler angles along x, y, and z axes.

Aspect 20. The system of any of Aspects 15-19, wherein the stylized images are headshots.

Aspect 21. The system of any of Aspects 17-20, wherein the processing system is to generate avatars corresponding to stylized images included in the stylized dataset of images utilizing the corresponding pose information.

Aspect 22. Three-dimensional (3D) avatars that are generated in a style listed in a text prompt, the 3D avatars generated by:
receiving the text prompt from a user, the text prompt including a descriptor of an illustrative style for the 3D avatars;
applying the descriptor to a dataset of images by executing a stable diffusion model to modify the dataset of images in the illustrative style corresponding to the descriptor;
training an efficient geometry-aware 3D generative adversarial network (EG3D) model with the modified dataset of images; and
producing the 3D avatars corresponding to the modified dataset of images by executing the EG3D model.

Aspect 23. The method of Aspect 22, wherein images included in the modified dataset of images have respectively corresponding Euler angles representing a pose.

Aspect 24. The method of either of Aspect 22 or Aspect 23, wherein the 3D avatars have a respective pitch, yaw, and roll corresponding to the Euler angles for the respective images.

What is claimed:

1. A method for producing a model to generate three-dimensional (3D) avatars, the method comprising:
stylizing a dataset of images by providing a user-input text prompt input and the dataset of images to a stable diffusion model; and
producing 3D avatars by providing the stylized dataset of images to an efficient geometry-aware 3D generative adversarial network (EG3D) model.

2. The method of claim 1, wherein the user-input text prompt lists an illustrative style for the 3D avatars.

3. The method of claim 2, wherein, along with the stylized dataset of images, a pose of respective ones of the stylized images is input to the EG3D model for training of the EG3D model.

4. The method of claim 3, wherein the pose is provided as metadata corresponding to respective ones of the stylized images.

5. The method of claim 4, wherein the pose includes Euler angles along x, y, and z axes.

6. The method of claim 3, wherein the EG3D model generates the 3D avatars corresponding to respective ones of the stylized images in the illustrative style listed in the user-input text prompt.

7. The method of claim 3, wherein the EG3D model generates the 3D avatars having a pitch, yaw, and roll corresponding to the pose provided for corresponding ones of the respective stylized images.

8. The method of claim 1, wherein the stable diffusion model comprises a latent diffusion model.

9. A method for providing a selection of three-dimensional (3D) avatars for an application user, the method comprising:
providing a text prompt, received from an account for the application user, to a stable diffusion model;
inputting a dataset of images to the stable diffusion model;
stylizing the dataset of images, by the stable diffusion model, based on the text prompt;
training an efficient geometry-aware 3D generative adversarial network (EG3D) model with the stylized dataset of images; and
outputting 3D avatars from the EG3D model for selection by the application user.

10. The method of claim 9, wherein the text prompt includes a desired style for the 3D avatars.

11. The method of claim 9, wherein the images in the stylized dataset of images respectively include pose information.

12. The method of claim 11, wherein the pose information is included as metadata and includes Euler angles along x, y, and z axis.

13. The method of claim 12, wherein the application is a social media application.

14. The method of claim 12, wherein the application is an online interactive game.

15. The method of claim 12, wherein the dataset of images includes headshots.

16. A system for providing customized avatars, comprising:
an input unit to transmit a text prompt; and
a processing system to:
receive the text prompt,
receive a dataset of images,
stylize the dataset of images by applying a descriptor included in the text prompt to the dataset of images by executing a stable diffusion model,
train an image generating model with the stylized dataset of images,
generate avatars in a style corresponding to the descriptor included in the text prompt by executing the image generating model, and
output at least a portion of the generated avatars to a user device for selection.

17. The system of claim 16, wherein the customized avatars are three-dimensional (3D).

18. The system of claim 17, wherein the image generating model is an efficient geometry-aware 3D generative adversarial network (EG3D).

19. The system of claim 16, wherein the descriptor is an illustration style.

20. The system of claim 16, wherein stylized images included in the stylized dataset of images include corresponding pose information indicating Euler angles along x, y, and z axes.

21. The system of claim 20, wherein the stylized images are headshots.

22. The system of claim 20, wherein the processing system is to generate avatars corresponding to stylized images included in the stylized dataset of images utilizing the corresponding pose information.

23. Three-dimensional (3D) avatars that are generated in a style listed in a text prompt, the 3D avatars generated by:
receiving the text prompt from a user, the text prompt including a descriptor of an illustrative style for the 3D avatars;
applying the descriptor to a dataset of images by executing a stable diffusion model to modify the dataset of images in the illustrative style corresponding to the descriptor;
training an efficient geometry-aware 3D generative adversarial network (EG3D) model with the modified dataset of images; and
producing the 3D avatars corresponding to the modified dataset of images by executing the EG3D model.

24. The avatars of claim 23, wherein images included in the modified dataset of images have respectively corresponding Euler angles representing a pose, and wherein the 3D avatars have a respective pitch, yaw, and roll corresponding to the Euler angles for the respective images.

* * * * *